April 26, 1960   L. J. CASTELLANOS   2,934,360
SWAGED PIPE COUPLING FOR OFF SHORE DRILLING
Filed July 16, 1956
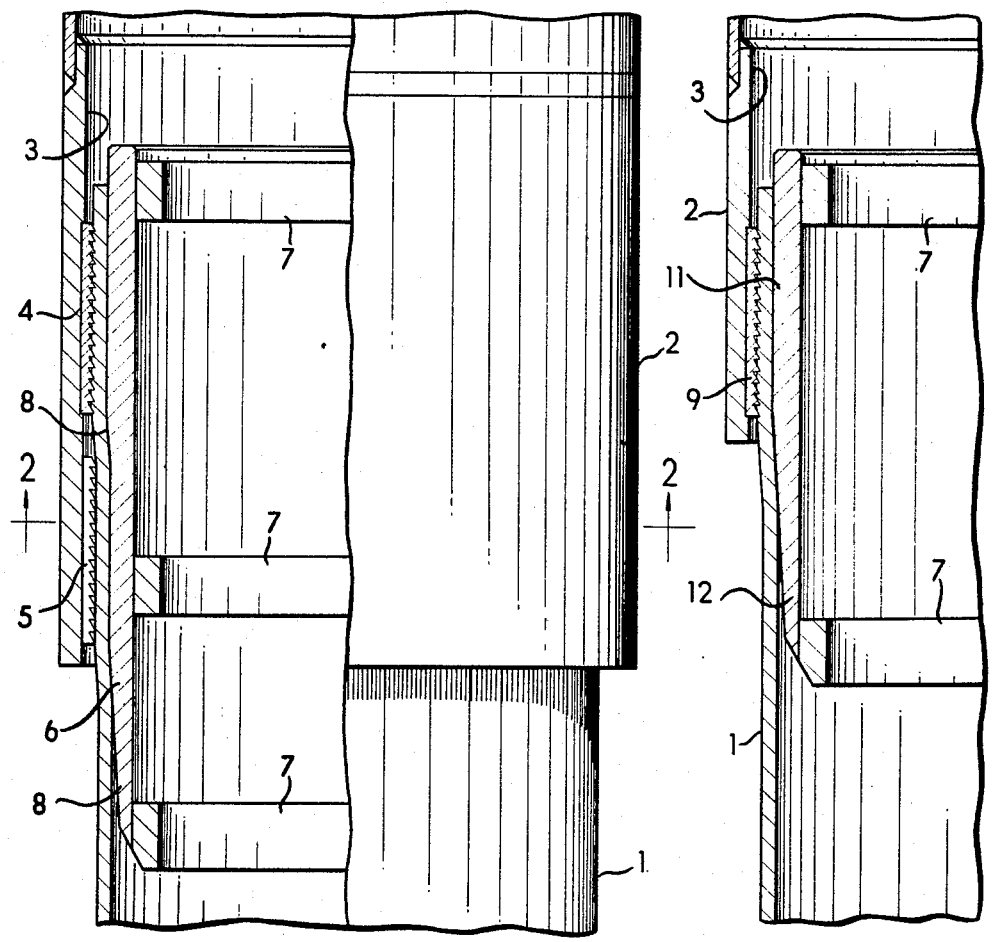
Fig. 1.
Fig. 3.
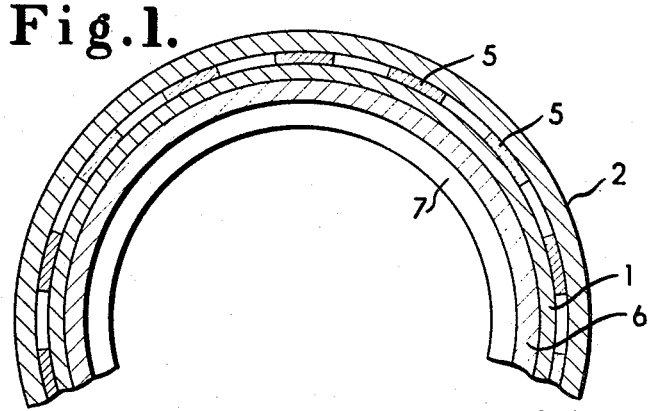
Fig. 2.
INVENTOR.
LEOPOLD J. CASTELLANOS.
BY

2,934,360

SWAGED PIPE COUPLING FOR OFF SHORE DRILLING

Leopold J. Castellanos, Houston, Tex., assignor to Fares Hanna, Houston, Tex.

Application July 16, 1956, Serial No. 597,973

3 Claims. (Cl. 285—18)

This invention relates to new and useful improvements in a union.

It is an object of this invention to provide novel means for connecting two sections of telescoping pipe.

It is another object of the invention to provide a union of tubular members for connecting said members in an axial direction in such a manner that longitudinal loads, bending movements and transverse loads will be transmitted from one member to the other.

In off shore drilling operations, it is necessary to connect the drilling platform and the like to the piling driven into the ocean floor. A tubular jacket is usually employed to guide the piling during its movement into the ocean floor, and after the piling has been set, the jacket is welded to the piling, usually at a point above the water level. It is an object of this invention to provide means for anchoring the jacket to the piling adjacent the ocean floor, after the piling is set, without the necessity of welding, terminating the piling above the ocean floor, thus saving large amounts of valuable piling.

With the above and other objects in view, the invention relates to certain novel features of construction and operation more particularly defined in the following specifications and illustrated in the accompanying drawings, wherein:

Figure 1 is a side elevational view of the union, partly in section, as applied to two tubular members.

Figure 2 is an end view of the device, taken on the line 2—2 of Figure 1, and

Figure 3 is a side elevational view of a modified form of the invention, partly in section.

Referring now more particularly to the drawings, the numeral 1 designates a tubular member, such as a piling. The numeral 2 designates a tubular member to be joined, such as the jacket leg, which has served as a guide for the piling during pile driving operations. The piling 1 may be terminated adjacent the point of joinder and the jacket 2 may be reinforced at its lower end as at 3 and a suitable number of toothed members, as 4, 5, may be welded, or otherwise secured, into the side wall of the reinforced portion of the tubing 2, with the teeth of said members, 4, 5, directed inwardly. A plug, or swedge, 6, having reinforcing ribs or stiffeners 7, 7, and being inwardly tapered as at 8, 8, forming two straight cylindrical areas, is formed of tubular material of an outside diameter slightly greater than the inside diameter of the tubular member 1.

When it is desired to join two sections of tubular members, the outer member, as 2, with the toothed members mounted therein in the desired number, is telescoped over the upper end of the smaller member 1, and the swedge 6 is lowered into the upper end of the smaller member, through the larger member, or placed in the smaller member by means of an adapter, and driven into place in any desired manner such as by a pile driver, the smaller portion of the swedge entering the top of the member 1, and the smaller portion of the swedge 6 being inwardly tapered at its end face to guide the swedge into the upper end of the tubular member to be joined, and when the expanded portion thereof contacts the wall of the member 1, it will force the wall outwardly against the teeth of the toothed members 4. If this is not sufficient to hold the parts, the swedge 6 may be driven on down into the member 1, forcing the material of the member 1 to expand outwardly against the teeth of the member 5 and increasing the expansion against the teeth of the member 4.

If desired, one series of toothed members, as 9, may be used, as illustrated in Figure 3, a swedge having only one cylindrical surface 11 and one tapered portion 12 bearing against the smaller of the two tubular members to be joined. Many unions will require only the amount of gripping as can be accomplished by this single swedge.

The cylindrical portion of each swedge contemplated is of the same vertical length as the length of the toothed members 4, 5, so that the gripping action of the full length of the members 4, 5 may be utilized.

If it is desired to remove a swedge from its locking position between the segments of pipe, a fishing tool or similar device may be lowered into the swedge and one of the ribs 7 engaged and the swedge withdrawn.

While the foregoing is considered preferred forms of the invention, it is by way of illustration only, the broad principle of the invention being defined by the appended claims.

What I claim is:

1. In a union, means for joining a pair of telescoping tubular members comprising a plurality of segments having inwardly directed teeth anchored to the outer member and a swedge having a plurality of straight cylindrical sides of varied diameter and formed to be received by and to reinforce the inner member and to expand the material of the inner member against said toothed segments.

2. In a union, means for joining a pair of telescoping tubular members comprising a plurality of segments having inwardly directed teeth anchored to the outer member and a swedge having a plurality of straight cylindrical sides of varied diameters and formed to be received by and to reinforce the inner member and to expand the material of the inner member against said toothed segments and means for withdrawing said swedge from said inner member.

3. In a union, a pair of telescoping tubular members, one end of one of said members being reinforced and having a plurality of annular rows of toothed segments mounted on the inside surface thereof, a swedge having a series of straight cylindrical sides of graduated diameter adapted to be inserted into the inner telescoping member and to expand the material of the inner member against said teeth and annular reinforcing ribs in said swedge.

References Cited in the file of this patent

UNITED STATES PATENTS

| | | |
|---|---|---|
| 43,998 | Ketchum | Aug. 30, 1864 |
| 579,817 | Connelly | Mar. 30, 1897 |
| 959,546 | Kenny | May 31, 1910 |
| 1,738,915 | Mueller | Dec. 10, 1929 |
| 1,794,849 | Hagstedt | Mar. 3, 1931 |
| 1,865,657 | Watt et al. | July 5, 1932 |
| 1,977,917 | Norgren | Oct. 23, 1934 |
| 2,000,481 | Harrison | May 7, 1935 |
| 2,071,478 | Wick | Feb. 23, 1937 |
| 2,185,726 | Elliott | Jan. 12, 1940 |
| 2,252,274 | Rossheim et al. | Aug. 12, 1941 |
| 2,479,058 | Batting | Aug. 16, 1949 |
| 2,485,049 | Hallisy | Oct. 18, 1949 |
| 2,754,577 | Maxwell | July 17, 1956 |

FOREIGN PATENTS

| | | |
|---|---|---|
| 955,523 | France | June 27, 1949 |